United States Patent [19]
Hughes

[11] 3,848,701
[45] Nov. 19, 1974

[54] SAWHORSE BRACKET

[76] Inventor: Elmer J. Hughes, 13613 San Pablo Ave., No. 17, San Pablo, Calif. 94806

[22] Filed: Sept. 10, 1973

[21] Appl. No.: 395,950

[52] U.S. Cl.............. 182/185, 182/224, 248/188, 108/156, 403/188, 403/169, 403/217
[51] Int. Cl............................................. F16b 7/00
[58] Field of Search .......... 403/169, 186, 188, 189, 403/217, 218, 219, 235, 389, 297, 205, 403, 406; 248/188, 165; 182/185, 224; 108/156; 46/29

[56] References Cited
UNITED STATES PATENTS

| 362,915 | 5/1887 | Zeigler | 108/156 |
|---|---|---|---|
| 1,281,800 | 10/1918 | Lustig | 403/188 |
| 1,661,687 | 3/1928 | Benjamin | 46/29 |
| 2,650,140 | 8/1953 | Boitos | 182/224 |
| 2,794,688 | 6/1957 | Scott | 182/185 |
| 2,904,379 | 9/1959 | Nelson | 403/297 |
| 3,265,342 | 8/1966 | Brettner | 248/188 |

FOREIGN PATENTS OR APPLICATIONS

| 667,896 | 7/1929 | France | 403/217 |
|---|---|---|---|

Primary Examiner—Jordan Franklin
Assistant Examiner—Wayne L. Shedd
Attorney, Agent, or Firm—Warren, Rubin & Chickering

[57] ABSTRACT

A device for demountably connecting the legs and ridge beam of a sawhorse and comprising a base member adapted for mounting at and securing to the underside of the beam with portions extending laterally therefrom and formed with openings for mounting of pipe legs; a pair of strap members demountably secured to the base member and to the opposite sides of the beam and providing a second support for the pipe legs; and means demountably fastening the legs to the strap members.

9 Claims, 6 Drawing Figures

PATENTED NOV 19 1974  3,848,701

SAWHORSE BRACKET

The invention relates to carpenter's sawhorses of the type having a ridge beam and pairs of diverging legs for supporting the beam in horizontal position for support of the work to be cut; and more particularly, to brackets which are commonly used for either demountably or permanently securing the legs to the ridge beam.

Sawhorse brackets are usually constructed to effect the joinder of dimensional lumber such as two-by-fours cut to lengths providing the ridge beam and legs of the sawhorse. The resulting sawhorse is always relatively heavy due largely to the weight of the two-by-four legs and is frequently not rigid and even unsteady due to the lack of precision in the length, angularity and securing of the legs.

The sawhorse bracket of the present invention will provide a very strong, rock steady sawhorse structure capable of heavy-duty load bearing support and which is nevertheless substantially lighter in weight than the all lumber sawhorse.

Another object of the present invention is to provide a sawhorse bracket of the character above in which the bracket parts are constructed of strong durable sheet metal stampings adapted for low-cost mass production, and for the use of common steel water pipe for the legs, thereby affording a very strong heavy-duty sawhorse of relatively lightweight and attractive appearance.

A further object of the present invention is to provide a sawhorse bracket of the character above which is composed of a minimum number of sturdily formed parts which can be quickly and easily assembled with a length of dimensioned lumber to provide the ridge beam and lengths of standard water pipe to provide the legs, and which may with equal simplicity and facility be disassembled, at least in part, for convenient, compact storage.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to said drawing.

Figure 1:
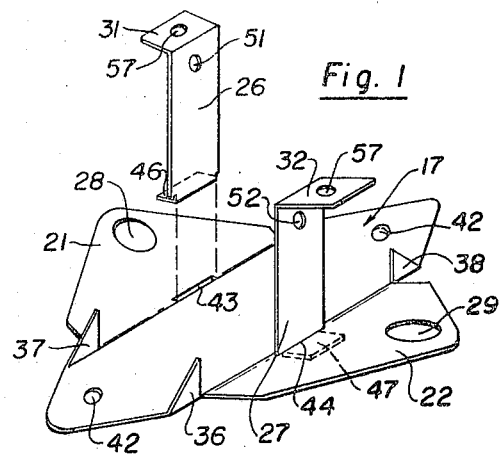
FIG. 1 is a perspective view of certain of the parts of the present sawhorse bracket.
Figure 4:
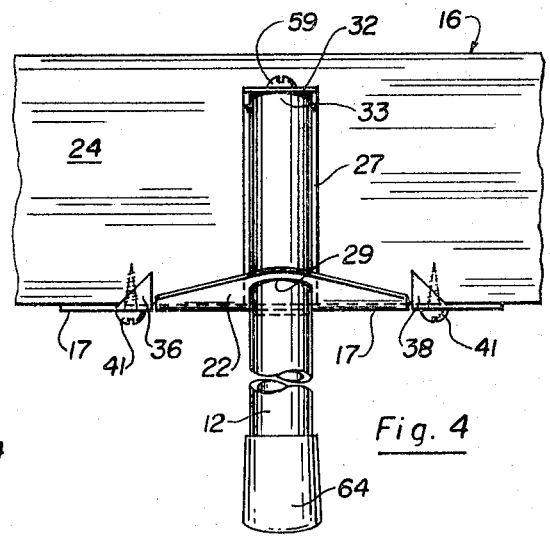
FIG. 4 is a side elevation of the bracket with the parts assembled.
Figure 5:
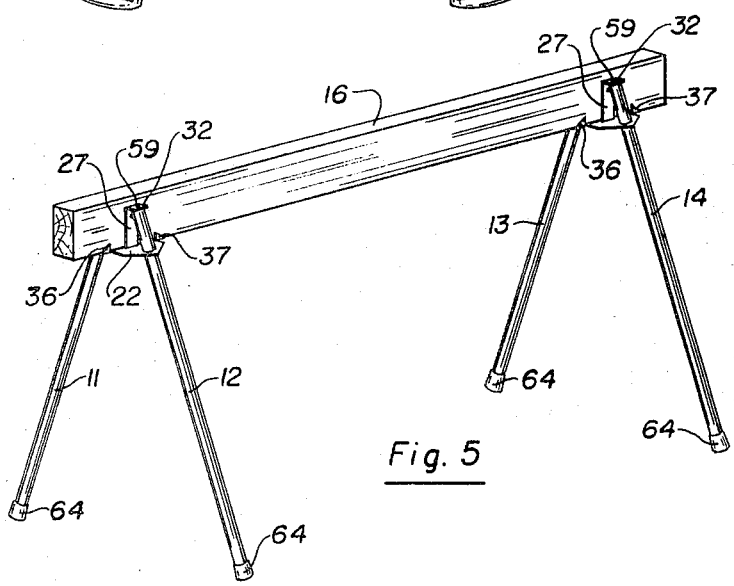
FIG. 5 is a perspective view of the completed sawhorse using the brackets of the present invention.
Figure 6:
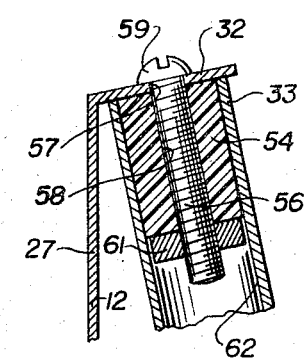
FIG. 6 is a fragmentary cross sectional view of one of the fastening means.

The device of the present invention functions to demountably connect the legs 11, 12, 13, and 14 and ridge beam 16 of a sawhorse as illustrated in FIG. 5 and comprises two identical assemblies, one for connecting legs 11 and 12 to the ridge beam 16 and the other for connecting legs 13 and 14 to ridge beam 16. Each of the assemblies comprises briefly a base member 17 adapted for mounting at and secured to the underside 18 of beam 16 and having portions 21 and 22 formed to extend laterally from the opposite sides 23 and 24 of beam 16; a pair of strap members 26 and 27; means connecting the base and strap members with the latter extending vertically from the base member, see FIGS. 1, 3, and 4, and spaced apart for engagement with and being adapted for securing to beam sides 23 and 24; base member portions 21 and 22 being formed with openings 28 and 29 dimensioned to slidably receive a pair of legs 11–14, and strap members 26 and 27 being formed with laterally extending parts 31 and 32 spaced from base portions 21 and 22 and in alignment with openings 28 and 29, in the attached position of the base and strap members, for engaging the upper ends 33 of legs 11–14 threaded through openings 28–29; and means, best shown in FIG. 6, for demountably fastening strap part 32 to the upper end 33 of each of the legs. Since the two assemblies shown in FIG. 5 are of identical form, the description of one will suffice.

Figure 3:
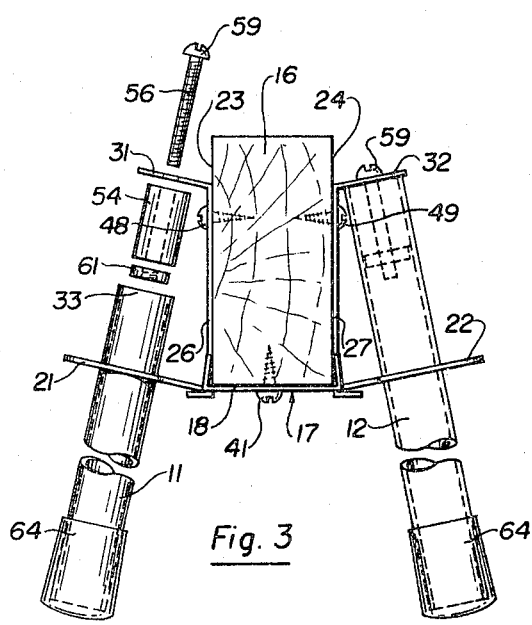
FIG. 3 is an end elevation of the bracket, partially assembled.

Preferably, base member 17 is formed to define a socket for receiving and centering thereon the underside 18 of beam 16. This is here effected by forming the base member 17 as a sheet metal plate having portions 36, 37, 38, and 39 struckup to define a channel for the ridge beam and providing the aforementioned socket. As will be observed, portions 36 and 37, and 38 and 39 are spaced apart by a distance slightly greater than the width of beam 16 so as to receive the beam therebetween when the beam is oriented as shown in FIGS. 3 and 5. Where the bracket is designed for use with a length of two-by-four lumber, finished four sides, for the ridge beam, the spacing between parts 36–37 and 38–39 will be slightly over 1 ⅝ inches. Fastening of the base member to the underside of beam 16 may be effected by one or more screws 41 mounted through openings 42 in base member 17.

Figure 2:
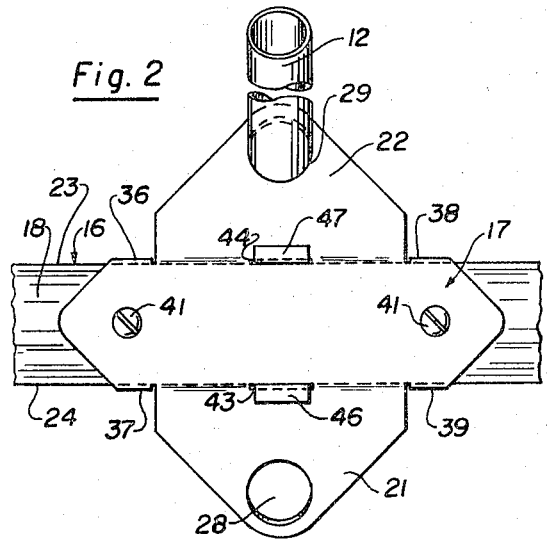
FIG. 2 is a bottom view of the bracket, partially assembled.

The means for fastening the base and strap members here comprises a pair of slots 43 and 44 in base member 16 and offset tongues 46 and 47 on strap members 26 and 27 engageable in slots 43 and 44 and interlocking with the base member in the upright position of the strap members as seen in the drawing. Tongues 46–47 are preferably bent at right angles from strap members 26 and 27 so as to extend through slots 43 and 44 and to lock under the bottom side of base member 17 as seen in FIG. 2 when the strap members are swung to an upright position for engagement with the opposite sides 23 and 24 of the beam. Fastening of the strap members to the beam in this position may be effected by one or more screws 48 and 49 mounted through openings 51 and 52 in the strap members. The opposite ends of the strap members are flanged outwardly to provide the laterally extending leg engaging parts 31 and 32. As will be observed, these parts extend from strap members 26 and 27 and the vertical sides 23 and 24 of the beam at an angle of 90° plus the incline of legs 11–14 so that the flanged ends 31 and 32 will fit squarely across the upper ends of the legs.

As a feature of the present invention, the bracket makes use of links of standard steel water pipe for legs 11–14 for imparting strength, ridigity and lightness of weight and the fastening means for demountably securing the legs is also a feature of the present construction. A pair of such fastening means is used with each assembly and each comprises, briefly, a plug of elastomeric material dimensioned for slidable insertion into the interior of one of the leg ends 33, and means for expanding the plug into gripping engagement with the leg. As here shown, such means comprises a bolt 56 mounted through an opening 57 in each flanged end 31–32 and extended through a longitudinal bore 58 in plug 54, the bolt having a head 59 supported on the upper side of flanged end 31–32 and a length extending through bore 58 with the plug mounted on the bolt and against the underside of flanged ends 31–32. A nut 61 is threaded on the lower end of bolt 56 and against the underside of plug 54 so as to place the plug in compression upon rotation of head 59 to thereby expand the plug into tight compressive fit against the interior wall 62 of leg 12–14. Normally, plug 54 will have an outside diameter slightly less than the internal diameter of wall 62 so as to permit easy sliding insertion of the plug into the interior of the pipe end. Nut 61 will be normally tightened against the lower end of plug 54 with "finger tightness" so as to frictionally retain the nut against the plug end. Thereafter, rotation of bolt 56 relative to nut 61 can be effected exteriorly by rotating head 59 with a screwdriver or the like so as to expand the elastomeric plug into tight compressive grip with the interior wall 62. This connection, together with the sliding connection of the pipe legs with the base member portions 21 and 22, through openings 28 and 29, afford a very rigid connection of the legs to the ridge beam 16. In this connection it will be noted that base portions 21 and 22 are flared upwardly from the central part of the base member and into parallel relation to flanged ends 31 and 32. The precision with which these parts may be oriented by the use of sheet metal stampings coupled with the above described leg fastening means, results in a precise rock steady positioning of the assembled sawhorse on any flat supporting surface. Rubber or plastic cups 64 may be mounted on the lower ends of pipe legs 11–14 for providing a non-marring, non-skid, load bearing floor engagement.

Legs 11–14 may in a reverse fashion and with equal ease and facility be removed from the bracket by simply turning bolt head 59 to decompress the elastomeric plugs 54 to their unstressed size following which the upper ends of the legs may be slipped from the plugs and out of the retaining openings 28 and 29. The bracket parts will be normally retained on the header beam 16 for subsequent setting up and use of the sawhorse.

I claim:

1. A device for demountably connecting the legs and ridge beam of a sawhorse comprising:
   a base member adapted for mounting at and securing to the underside of said beam and having portions formed to extend laterally from the opposite sides of said beam;
   a pair of strap members;
   means connecting said base and strap members with the latter extending vertically from said base member and spaced apart for engagement with and being adapted for securing to said beam sides;
   said base member portions being formed with openings dimensioned to slidably receive a pair of legs and said strap members being formed with laterally extending parts spaced from said base portions and in alignment with said openings, in the attached position of said base and strap members, for engaging the upper ends of said legs threaded through said openings; and
   means for demountably fastening said parts and legs.

2. A device as defined in claim 1, said base member defining a socket for receiving and centering thereon said ridge beam.

3. A device as defined in claim 2, said base member comprising a sheet metal plate having portions struckup to define a channel for said ridge beam and providing said socket.

4. A device as defined in claim 2, said first named means comprising slots in said base member and offset tongues on said strap members engageable in said slots and interlocking said base member in the upright position of said strap members.

5. A device as defined in claim 4, said strap members having outwardly flanged upper ends defining said parts.

6. A device as defined in claim 3, said first named means comprising slots in said base member;
   said strap members comprising sheet metal stampings having offset tongues at one end engageable in said slots and interlocking with said base member in the upright position of said strap members; and
   the opposite ends of said strap members being outwardly flanged to define said parts.

7. A device as defined in claim 1 for connecting legs having hollow ends, said last named means comprising:
   a pair of plugs of elastomeric material dimensioned for slidable insertion into said leg ends; and
   means for expanding said plugs into gripping engagement with said legs.

8. A device as defined in claim 7, each of said plugs having a bore;
   each of said parts having an opening;
   a bolt dimensioned for mounting through each part opening and through each bore and having a head dimensioned for support on said part and a length extending through said plug with the latter mounted thereon against said part; and
   a nut threadable on each bolt for bearing on each plug.

9. A device as defined in claim 6 for connecting pipe legs, said last named means comprising:
   a pair of plugs of elastomeric material dimensioned for slidable insertion into said leg ends and each having a longitudinal bore;
   each of said flanged strap ends having an opening;
   a bolt dimensioned for mounting through each strap end opening and through each bore and having a head dimensioned for support on each strap and a length extending through each plug with the latter mounted thereon against said strap; and
   a nut threaded on each bolt for bearing on each plug.

* * * * *